United States Patent [19]
Reed

[11] 3,982,615
[45] Sept. 28, 1976

[54] CONSTANT SPEED DRIVE
[75] Inventor: David F. Reed, Kansas City, Mo.
[73] Assignee: Borg-Warner Corporation, Chicago, Ill.
[22] Filed: Feb. 7, 1975
[21] Appl. No.: 547,840

[52] U.S. Cl. .................. 192/103 F; 192/104 F; 192/85 R; 192/56 F
[51] Int. Cl.² .................................. F16D 25/02
[58] Field of Search ......... 192/103 R, 103 F, 104 R, 192/104 F, 56 F, 85 R; 417/223

[56] References Cited
UNITED STATES PATENTS

| | | | |
|---|---|---|---|
| 3,155,040 | 11/1964 | Shurts et al. | 192/56 F X |
| 3,447,397 | 6/1969 | Black et al. | 192/104 X |
| 3,556,271 | 1/1971 | Hilpert | 192/104 X |
| 3,563,355 | 2/1971 | Goodson et al. | 192/104 |
| 3,621,955 | 11/1971 | Black et al. | 192/103 F X |
| 3,653,476 | 4/1972 | Allen et al. | 192/104 F |
| 3,849,027 | 11/1974 | Blake | 417/233 |

FOREIGN PATENTS OR APPLICATIONS
1,131,032   10/1968   United Kingdom ............ 192/103 F Primary Examiner—Samuel Scott
Assistant Examiner—Lance W. Chandler
Attorney, Agent, or Firm—James A. Geppert

[57] ABSTRACT

A constant speed drive system which is automatically controlled according to the load of the pump, fan, etc. driven by the system. Control of the system is achieved by means of a pump or compressor and a diaphragm-actuated spool valve, wherein a reference point or pressure in a spool valve is matched with a pressure, proportional to the speed of the load or output shaft, acting on a diaphragm in the spool valve. The spool valve, in turn, modulates the pressure to a clutch actuator for a clutch located between a constant speed motor and a shaft driving the requisite load.

9 Claims, 1 Drawing Figure

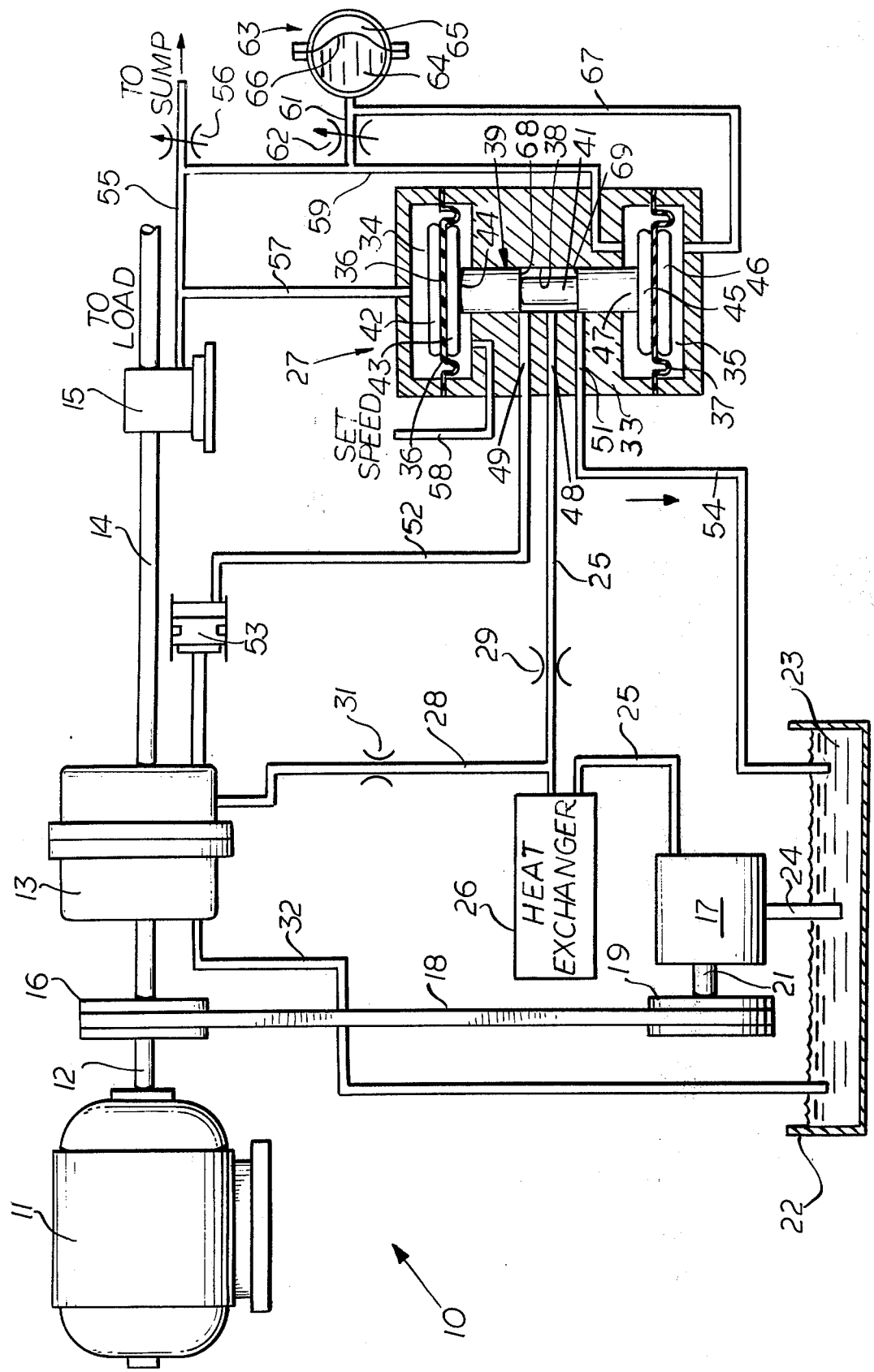

CONSTANT SPEED DRIVE

BACKGROUND AND SUMMARY OF THE INVENTION

The present invention relates to a constant speed drive for an output load, such as a pump, fan, etc., and more particularly to a drive which is lead compensated and will anticipate changes in the output speed to the load and make appropriate corrections therefor.

Presently utilized control devices providing a constant speed for a load involve in their simplest form a magnetic pick-up and an electric servovalve. As the control function becomes more sophisticated and sensitive, the system becomes more and more complex in its arrangement and function. Thus, very complex systems have evolved using a tachometer and electrical control circuits. Other systems utilize complex hydraulic valving alone or associated with electrical control circuits. The present invention provides a simplified control system which overcomes disadvantages inherent in many prior known systems.

Among the objects of the present invention is the provision of a constant speed drive for an output load, such as a pump or fan, wherein the complexity of the system is minimized. The system is hydraulic in nture without any electrical connections and the attendant fire hazards.

Another object of the present invention is the provision of a constant speed drive for an output load which has a lead compensation that anticipates the variations in the output shaft speed and initiates appropriate correction for the variation.

A further object of the present invention is the provision of a constant speed drive utilizing a hydraulic circuit with a spool valve controlling actuation of a clutch in the drive line between a constant speed motor and an output shaft to the load being driven. The system can be made as sensitive to speed (pressure) changes as desired by changing the area of the diaphragm in the spool valve.

The present invention relates to a hydraulically-actuated system for speed control of an output shaft driven by a constant speed motor through a clutch. The pressure actuator for the clutch is controlled through a spool valve receiving fluid from a pump driven by the motor. A second pump, driven by the output shaft, provides fluid pressure to an accumulator and to the spool valve; with the various pressures acting upon diaphragms to provide for adjustment of the spool valve.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWING

The drawing is a schematic view of the constant speed drive embodying the present invention.

DESCRIPTION OF THE PREFERRED EMBODIMENT

Referring more particularly to the disclosure in the drawing wherein is shown an illustrative embodiment of the present invention, a constant speed drive system 10 utilizes a constant speed motor 11 driving a motor shaft 12 which is connected to a driving member in a clutch assembly 13. An output shaft 14 is rotated by a driven member in the clutch assembly 13 to operate a load, such as a pump or a fan (not shown). A pump or compressor 15 is directly driven by the output or load shaft 14 to provide a fluid pressure proportional to the speed of rotation of the shaft 14 for a purpose to be later described.

a pulley 16 mounted on the input shaft 12 for the clutch assembly 13 drives a fluid pump 17 through a drive belt 18 and pulley 19 on the drive shaft 21 of the pump. A reservoir or sump 22 provides a supply of fluid 23 utilized for actuation of the clutch assembly and for a fluid supply for the pump 15. An inlet conduit 24 extends into the reservoir 22 to provide fluid to the pump 17, and an outlet conduit 25 extends from the pump 17 through a suitable heat exchanger 26 to a spool valve 27. A branch line 28 extends from the conduit 25 at a point beyond the heat exchanger 26 to the clutch assembly 13 to provide cooling fluid to the clutch surfaces of the driving and driven members. A restriction 29 is provided in the conduit 25 beyond the branch line 28 and a second restriction 31 is provided in the line 28 to limit the flow of cooling fluid to the clutch. A return line 32 leads from the clutch assembly 13 to the sump or reservoir 22.

The spool valve 27 comprises a valve body 33 having diaphragm chambers 34, 35 adjacent the opposite ends thereof and housing a pair of diaphragms 36, 37, respectively, having their peripheries secured in the housing. A central passage 38 extends axially through the valve body between the chambers 34 and 35 and houses a valve stem 39 having a central reduced diameter portion 41 conformably received therein for axial sliding movement. A pair of diaphragm plates 42, 43 sandwich the central portion of the upper diaphragm 36 and are secured to one end 44 of the valve stem 39, and a second pair of diaphragm plates 45, 46 sandwich the central portion of diaphragm 37 and are secured to the opposite end 47 of the valve stem.

The conduit 25 enters the valve body 33 at an inlet 48 centrally located between the chambers to intersect the passage 38 at the reduced portion 41 of the valve stem 39. Substantially equally spaced from the inlet 48 are a pair of outlets 49 and 51; the outlet 49 connected to a conduit 52 leading to an actuating piston 53 of the clutch actuator, and the outlet 51 communicating with a drain line 54 leading to the sump 22.

The pump or compressor 15 operates in a system that is either a self-contained pneumatic system utilizing a compressor or a hydraulic system. For a hydraulic system, the pump 15 communicates with a source of fluid which may be either the sump 22 or a separate sump (not shown), and a line 55 extends from the pump 15 through an adjustable restriction 56 to return fluid to the sump. A branch line 57 extends from the conduit 55 to the end of the valve body 33 to communicate with the diaphragm chamber 34 at the side of the diaphragm 36 opposite the valve stem 39. A conduit 58 enters the chamber 34 on the opposite side of the diaphragm 36 and communicates with a set-point pressure acting to determine the desired speed of the output shaft 14.

A second branch line 59 extends between the conduit 55 and the diaphragm chamber 35 on the same side of the diaphragm 37 as the valve stem 39. A further branch conduit 61 extends from the line 59 through an adjustable restriction 62 to the fluid side 64 of an air-fluid accumulator 63. A diaphragm 66 in the accumulator separates the fluid side 64 from a compressible gas side 65 providing a cushion in the accumulator. A conduit 67 intersects the conduit 61 between the restriction 62 and the accumulator 63 and communicates with the diaphragm chamber 35 on the side of the diaphragm 37 opposite the valve stem.

In operation, the motor 11 drives the output shaft 14 at a constant speed to drive a load applied thereto through the clutch assembly 13, with the shaft 14 also operating the pump or compressor 15. The pump 15 provides a fluid pressure that is proportional to the shaft speed which acts on one side of the diaphragm 36 through the conduits 55 and 57. The force created by the speed signal pressure acting on the diaphragm 36 is counteracted by the set-point or reference pressure through the conduit 58; which pressure is of a predetermined value. Also, the pump 17 driven at a constant speed by pulleys 16 and 19 and belt 18 provides a fluid supply at a substantially constant pressure through the conduit 25 to the spool valve 27. The fluid is cooled in the heat exchanger 26 so that the portion diverted through the branch line 28 and restriction 31 acts to cool the friction plates in the clutch assembly 13.

The valve stem 39 having the reduced central portion 41 is controlled by the pressure differentials on the diaphragms 36 and 37 and controls the flow of fluid from the conduit 25 to the conduit 52 actuating the clutch piston 53 and to the return conduit 54 to the sump 22. Considering the upper diaphragm 36 with the set-point providing a constant pressure through the conduit 58, the position shown for the valve stem 39 provides a specific pressure level actuating the piston 53. If the motor 11 increases in speed due to a power surge, etc., causing an increase in the speed of the output shaft 14, the fluid pressure from the pump 15 increases proportionally to provide a pressure imbalance on the diaphragm 36. This pressure differential results in a downward movement of the valve stem 39, with the shoulder 68 on the valve stem acting to close or decrease the effective area of the outlet 49 and the shoulder 69 increasing the effective area of the outlet 51. Thus, more fluid is allowed to return to the sump 22 through conduit 64 and the pressure acting on piston 53 is decreased to lessen the clutch actuation force, which results in a decrease of the shaft speed to the predetermined constant value.

Likewise, if the speed of the output shaft 14 drops below the desired constant speed, the fluid pressure provided by the pump 15 will decrease proportionally, causing a pressure imbalance on the diaphragm 36, resulting in upward movement of the valve stem 39 as seen in the drawing. Thus, valve stem movement will tend to uncover the outlet 49 and close the outlet 51, resulting in an increase in fluid pressure acting on the piston 53 to provide greater clutch engagement and increase the speed of the shaft 14 to its predetermined level.

The addition of the accumulator 63 to the fluid circuit provides a lead compensated drive which will "anticipate" changes in the output speed of the shaft 14 and initiate the appropriate correction. The adjustable restriction 62 in the line 61 provides a "lead" restriction resulting in a pressure through the line 61 to the accumulator 63 proportional to the shaft speed of the output shaft 14, which pressure is normally equal to the pressure in the line 59 communicating with one side of the diaphragm 37. The accumulator pressure directly communicates with the opposite side of diaphragm 37 through the conduit 67.

The variations in the output speed of shaft 14 will tend to raise or lower the pressure in the accumulator 63, but the pressure in the accumulator cannot change rapidly due to the restriction 62. The net effect of this system is that by sensing the pressure differential across the orifice 62 and applying it to the diaphragm 37 through the conduits 59 and 67 to adjust the movement of the valve stem 39, a change in speed more rapid than the time constant of the restriction 62 and the accumulator 63 will tend to damp itself out. The damping rate may be adjusted by adjusting the lead restriction 62, and the nominal speed is maintained as previously described.

With the apparatus shown in the drawing, it may be advantageous to have the compensating force on the spool be greater or smaller than the restoring force due to the set-point pressure, in which case the diaphragms may be of unequal areas. If the speed of the output shaft is to be changed from its predetermined level, such change is accomplished by increasing or decreasing the set-point pressure to a new level.

I claim:

1. A constant speed drive for a shaft driving a load, comprising a source of energy to drive the shaft, a clutch assembly interposed between the energy source and the shaft, an actuator for the clutch assembly, and a control circuit for the clutch assembly responsive to the speed of rotation of the shaft, said control circuit including means driven by said shaft to provide a fluid pressure proportional to shaft speed, means providing a source of fluid pressure for said actuator, a spool valve actuated by said fluid pressure means to control said actuator pressure and having a valve stem operatively connected to at least one diaphragm at an end thereof, said fluid pressure means driven by the shaft communicating with one side of the diaphragm and a reference pressure source communicating with the opposite side of the diaphragm, and means for damping any pressure change from said first mentioned means to said spool valve.

2. A constant speed drive as set forth in claim 1, in which said source of fluid for the actuator is a pump driven by the source of energy.

3. A constant speed drive as set forth in claim 1, in which said fluid pressure means driven by the shaft is a pump.

4. A constant speed drive for a shaft driving a load, comprising a source of energy to drive the shaft, a clutch assembly interposed between the energy source and the shaft, an actuator for the clutch assembly, and a control circuit for the clutch assembly responsive to the speed of rotation of the shaft, said control circuit including means driven by said shaft to provide a fluid pressure porportional to shaft speed, means providing a source of fluid pressure for said actuator, valve means actuated by said fluid pressure means to control said actuator pressure, and means for damping any pressure change from said first mentioned means to said valve means including an accumulator communicating with said first mentioned fluid pressure means, a restriction between said fluid pressure means and said accumulator, and said valve means includes a diaphragm operatively connected thereto, the opposite sides of said diaphragm communicating with the fluid pressure means and the accumulator at the opposite sides of said restriction.

5. A constant speed drive as set forth in claim 4, in which said valve means includes a valve stem having one end operatively connected to said diaphragm and the opposite end operatively connected to a second diaphragm, said first fluid pressure means and a reference pressure source communicating with the opposite sides of said second diaphragm.

6. A constant speed drive as set forth in claim 5, in which said valve means includes an inlet communicating with the fluid pressure source for the actuator and an outlet communicating with said actuator, said valve stem having a reduced diameter portion controlling the effective area of said inlet and outlet.

7. A constant speed drive for the rotation of an output shaft driving a load, comprising a motor providing a rotary power source, a clutch assembly interposed between said motor and said output shaft, an actuator for the clutch assembly, and a control circuit for the clutch assembly dependent on the speed of rotation of the output shaft, said control circuit including a first pump driven by said motor to provide a source of fluid pressure, a second pump driven by said output shaft to provide a source of fluid pressure proportional to the speed of the output shaft, a control valve having an inlet communicating with said first pump, a first outlet communicating with said clutch actuator, a second outlet communicating with a sump for the pressure fluid, an axially movable valve stem having a central portion of reduced diameter to control the flow of fluid to said actuator, a first diaphragm and a second diaphragm operatively connected to the opposite ends of the valve stem, a set-point pressure source communicating with one side of said first diaphragm, an accumulator, and a restriction in a line leading to the accumulator, said second pump providing fluid pressure to the side of the first diaphragm opposite said set-point pressure, to one side of the second diaphragm and to the line leading to the accumulator, said accumulator directly communicating with the other side of said second diaphragm.

8. A constant speed drive as set forth in claim 7, in which the pressure differential across said restriction acts to damp out the effect of a change in output speed on the control valve.

9. A constant speed drive as set forth in claim 7, including a heat exchanger to cool the fluid from the second pump, and conduit means communicating between the heat exchanger and the clutch assembly to cool the clutch assembly during operation.

* * * * *